United States Patent [19]
Kishimoto et al.

[11] Patent Number: 6,000,450
[45] Date of Patent: *Dec. 14, 1999

[54] STUDLESS TIRE

[75] Inventors: Yoshikazu Kishimoto, Kakogawa; Kenichi Mineta; Kazuo Asano, both of Kobe, all of Japan

[73] Assignee: Sumitomo Rubber Industries, Ltd., Hyogo-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/749,549

[22] Filed: Nov. 15, 1996

[30] Foreign Application Priority Data

Nov. 15, 1995 [JP] Japan ................................. 7-296869

[51] Int. Cl.$^6$ ............................. B60C 11/11; B60C 11/12; B60C 107/00
[52] U.S. Cl. ................................. 152/209.1; 152/209.18; 152/209.22; 152/209.27; 152/902; 152/DIG. 3
[58] Field of Search .......................... 152/209 R, 209 D, 152/DIG. 3, 209.1, 209.18, 209.22, 209.27, 902; D12/138, 140, 148

[56] References Cited

U.S. PATENT DOCUMENTS

| | | | |
|---|---|---|---|
| D. 72,619 | 5/1927 | Greer | D12/148 |
| D. 194,733 | 2/1963 | Hawkinson. | |
| 3,998,256 | 12/1976 | Verdier | 152/209 R |
| 4,200,134 | 4/1980 | Takigawa et al. | 152/290 R |
| 5,031,680 | 7/1991 | Kajikawa et al. | 152/209 R |
| 5,385,189 | 1/1995 | Aoki et al. | 152/209 R |
| 5,605,588 | 2/1997 | Hatakenaka et al. | 152/209 R |

FOREIGN PATENT DOCUMENTS

| | | | |
|---|---|---|---|
| 2080328 | 4/1993 | Canada | 152/209 D |
| 2084741 | 6/1993 | Canada | 152/209 R |
| 2-114006 | 4/1990 | Japan | 152/209 R |
| 1458250 | 2/1989 | U.S.S.R. | 152/209 R |

*Primary Examiner*—Steven D. Maki

[57] ABSTRACT

A studless tire comprises tread blocks having a narrow-width center portion, a heel-side increasing-width portion and a toe-side increasing-width portion, wherein the axial width of the block becomes minimum in the narrow-width portion and increases toward the heel edge and toe edge in the heel-side and toe-side increasing-width portions, and the minimum width in the narrow-width portion being in the range of from 0.5 to 0.9 times the average of the maximum width in the heel-side increasing-width portion and the maximum width in the toe-side increasing-width portion, whereby the stress produced in the block rubber when a braking force or driving force acts thereon increases the apparent block rigidity to decrease the block edge lifting and thereby uneven wear can be decreased.

16 Claims, 9 Drawing Sheets

Direction of Rotation

Tire A

Tire B

Tire C

STUDLESS TIRE

The present invention relates to a studless tire having an improved tread portion of which uneven wear resistance is improved without sacrificing on-the-snow/ice performance.

BACKGROUND OF THE INVENTION

Recently, a studless tire has come into wide use, instead of spike tires, tire dust pollution problems.

The studless tires are usually provided with a block type tread pattern for the excellent road grip performance on snowy and icy roads. In the tread portion of such tire, rubber compounds which maintain flexibility at a low temperature are used in order to further improve the road grip performance on the mainly icy roads. Accordingly, due to the flexible tread rubber, tread blocks are greatly deformed by braking and driving forces, and as a result, the conventional studless tires suffer from uneven wear problems as shown in FIG. 7(b) (hereinafter heel/toe wear) when running on dry or wet roads whose frictional coefficient is relatively high.

FIG. 7(a) shows a state of a tread block (b) which is subjected to a braking force F. As the tire rotates, the heel (c) of the block first contacts with the road surface, and the heel portion is first compressed. Thereafter, the toe (d) contacts with road surface, and then due to the difference in speed between the road surface and the inside of the block, a shearing force towards the heel portion (c) is produced. This shearing force increases as the tire rotates and finally lifts the heel of the block from the road surface to decrease the ground pressure. On the other hand, in the toe portion (d), the ground pressure increases. Therefore, when the block is detached from the road surface, the toe portion (d) is subjected to a maximum ground pressure. Thus, a large wear energy concentrates on the toe portion (d) and the amount of wear in this portion becomes larger than the heel portion (c). Contrary to the above, when a driving force acts on the block, the above-explained conditions are reversed, and therefore wear becomes larger in the heel (c) than the toe (d). Thus, heel-toe wear problems arise.

SUMMARY OF THE INVENTION

It is therefore, an object of the present invention to provide a studless tire in which, by controlling the lifting of the heel and toe portions of block when subjected to braking or driving forces, the resistance to heel/toe wear is improved without sacrificing on-the-snow/ice running performance.

According to one aspect of the present invention, a studless tire comprises a tread portion comprising blocks divided by at least one circumferential groove and axial grooves extending therefrom, each of the blocks having two circumferential edges extending in substantially parallel with the tire axial direction and two side edges, each of the blocks comprising
a narrow-width portion in which the axial width of the block becomes minimum,
a heel-side increasing-width portion in which the width increases from the narrow-width portion toward one of the circumferential edges,
a toe-side increasing-width portion in which the width increases from the narrow-width portion toward the other circumferential edge, the minimum width in the narrow-width portion being in the range of from 0.5 to 0.9 times the average of the maximum width in the heel-side increasing-width portion and the maximum width in the toe-side increasing-width portion.

The inventors conducted the following heel-toe wear test and discovered that the above-mentioned configuration of the block brings advantageous results to the resistance to the heel/toe wear.

Test tires A, B and C each provided with one type of tread block as shown in FIGS. 8, 9 and 10, respectively, were made. The test tires were mounted on the front wheels of a front-wheel-drive vehicle, and run for 500 km distance in a tire test course, applying the brakes 4 times/3 km at a speed 100 km/h so as to produce 0.45G midway through the test, the right side tires and the left side tires exchanged positions. Then, as the heel/toe wear, the difference between the maximum wear at both the circumferential edges of the block and the minimum wear in the center of the block was measured at eight points on the circumference of the tire.

The test results are shown in FIG. 11, which shows that the tire B provided with blocks having the above-mentioned configuration was effectively improved in the heel/toe wear.

Block sizes:

Tire A: a1=a2=19.7 mm, a4=24.0 mm

Tire A: a1=a2=23.2 mm, a3=16.2 mm, a4=24.0 mm

Tire C: a1=a2=16.2 mm, a3=23.2 mm, a2=24.0 mm

Common data:

| | |
|---|---|
| Tire size | 5.60R13 6PR |
| Tread width TW | 123 mm |
| Circumferential-groove width g1 | 6 mm |
| Axial-groove width g2 | 8 mm |
| Number of sipes | 4 |
| Sipe width | 0.5 mm |

Further, the heel-toe wear was measured in the same way as above, changing the ratio of the minimum width (Ws) to the average ((Wf+Wr)/2) of the maximum width (Wf and Wr) of the block.

The test results are shown in FIG. 12, which shows that the ratio should be 0.5 to 0.9 more preferably 0.65 to 0.8. If the ratio is less than 0.5, the narrow-width portion excessively decreases in rigidity, and a stress concentrates on this portion, and cracks and tear are liable to occur. If the ratio is more than 0.9, the effect on controlling the heel-toe wear can not be fully displayed.

BRIEF DESCRIPTION OF THE DRAWING

Embodiments of the present invention will now be described in detail in conjunction with the accompanying drawings, in which.

DETAILED DESCRIPTION OF THE INVENTION

Figure 1:
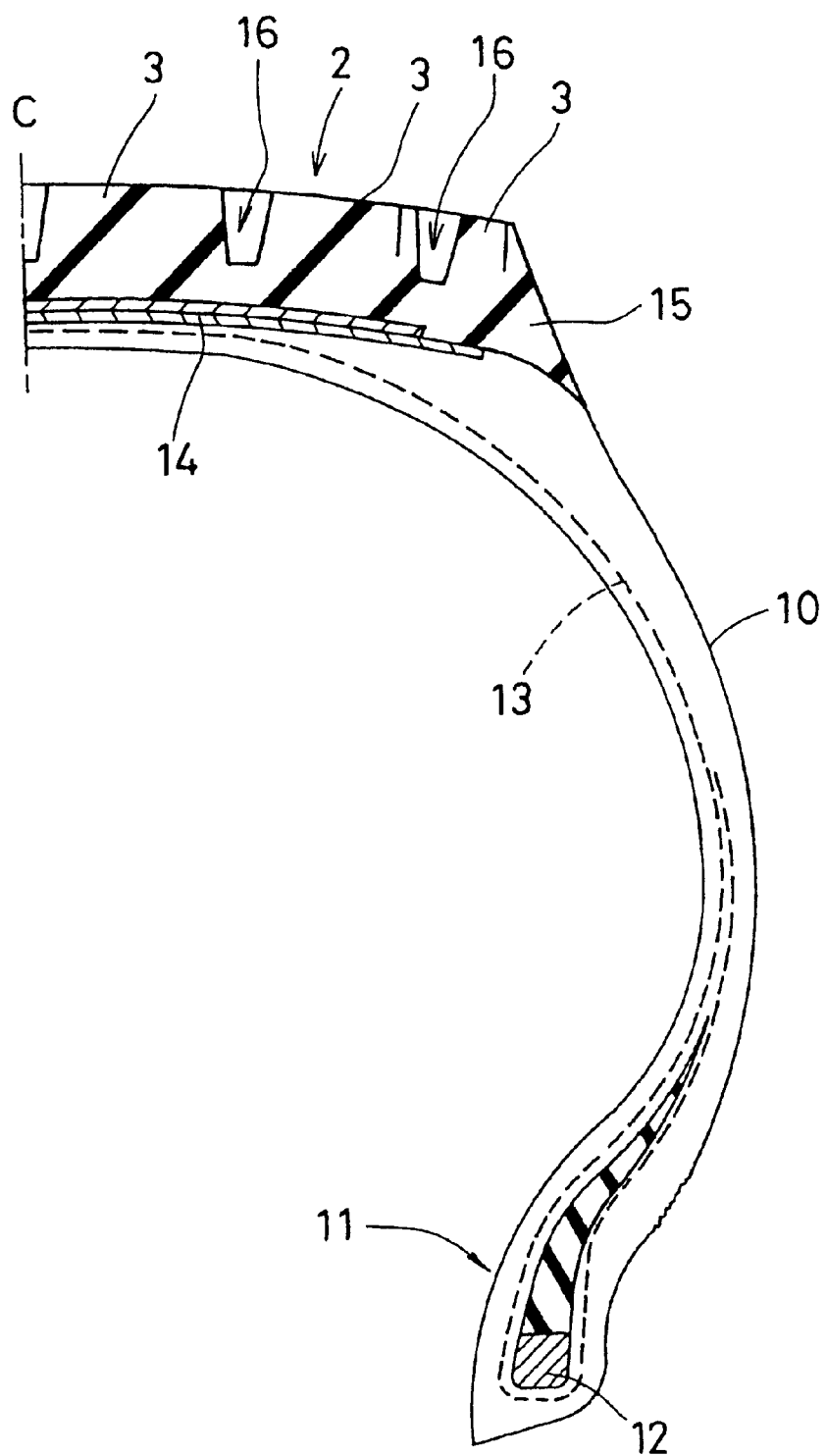
FIG. 1 is a cross sectional view of an embodiment of the present invention.

In FIG. 1, the studless tire according to the present invention is a pneumatic radial tire for passenger cars.

The tire comprises a tread portion 2, a pair of axially spaced bead portions 11, and a pair of sidewall portions 10 extending between the tread edges and the bead portions 11, a pair of bead cores 12 with one disposed in each of the bead portions 11, a carcass 13 extending between the bead portions 11 through the thread portion 2 and sidewall portions 10 with the edges thereof turned up around the respective bead cores 12 to be secured thereto, and a belt 14 disposed radially outside the carcass 13 and inside a tread rubber.

The carcass 13 is composed of at least one radial ply, in this example a single ply, of carcass cords radially arranged at an angle of from 70 to 90 degrees with respect to the tire equator C. For the carcass cords, steel cords and organic fiber cords, e.g. nylon, rayon, polyester and the like can be used.

The belt 14 comprises a cross-ply breaker and optionally a zero-degree band wound thereon.

The breaker comprises at least tow cross plies, in this example only two plies, of parallel cords laid at an angle of from 10 to 35 degrees with respect to the tire equator C so that the cords in each ply cross the cords in the next ply. For the belt cords, metal cords such as steel cords are preferably used, but organic fiber cords such as rayon and the like can be used.

In the tread portion 2, a tread rubber 15 whose JIS-A hardness is in the range of from 50 to 60 degrees at a temperature of 0 degree C. is preferably used, whereby the tread portion 2 maintains flexibility under such a low temperature condition to increase the actual ground contacting area, and thereby it becomes possible to improve running performance on snowy roads. Here, the tread rubber 15 is defined as the rubber disposed radially outside the belt to define the tread face.

The tread portion 2 is provided with tread grooves defining a tread pattern comprising blocks 3 in a plurality of rows (R1, R2, R3). The tread grooves include circumferential grooves 16 extending continuously in the tire circumferential direction, and axial grooves 17 extending from each of the circumferential grooves 16 to the adjacent circumferential groove 16 or tread edge.

Here, the tread groove are defined as having a relatively
  wide groove width in the range of not less than 6 mm when measured at the tread surface under a normally inflated condition such that the tire is inflated to the standard inner pressure, (measured axially in case of the circumferential groove and circumferentially in case of axial groove)

Figure 2:
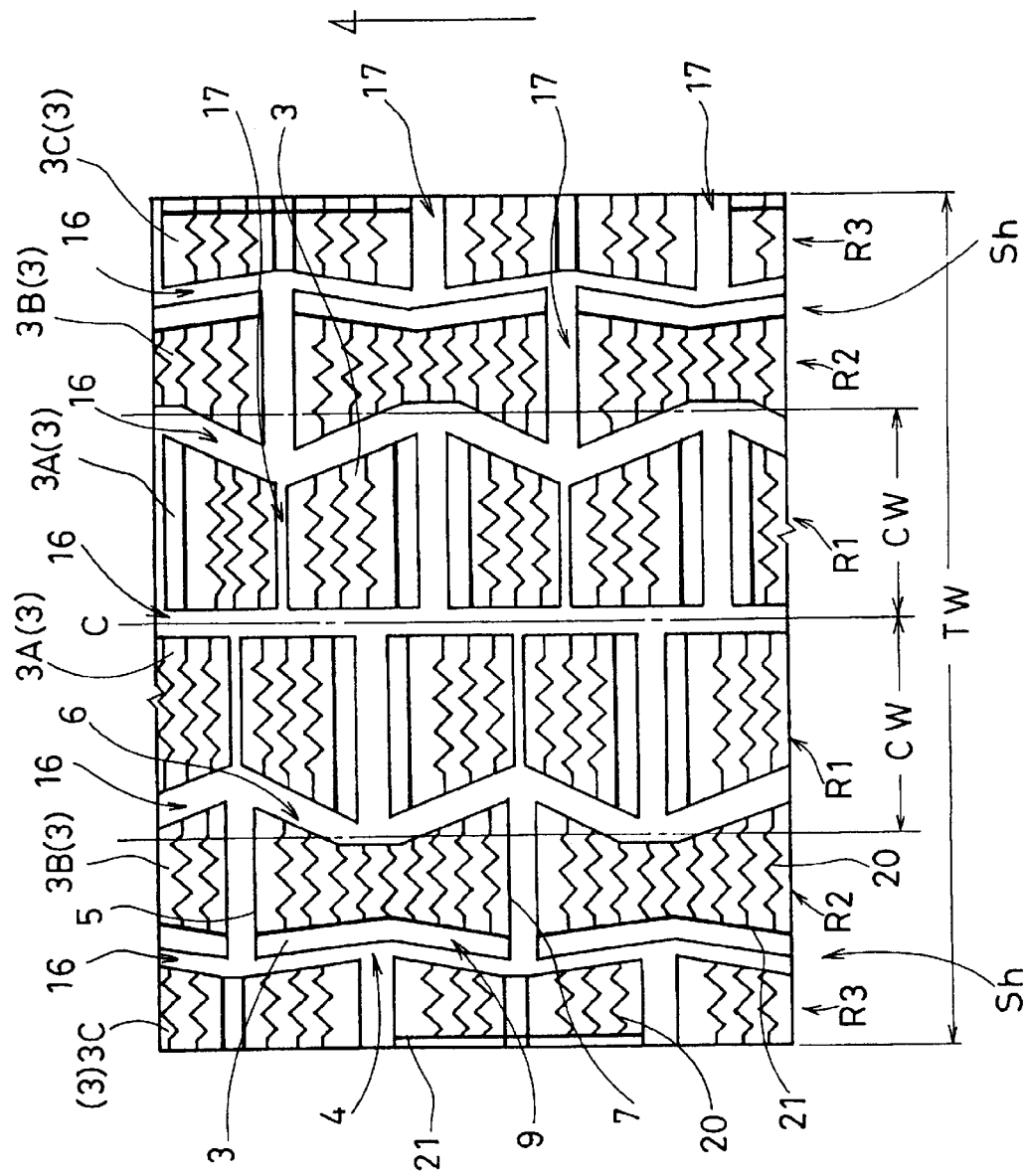
FIG. 2 is a developed plan view showing an example of the tread pattern.

FIG. 2 shows an example of the tread pattern, which is a block pattern defined by only blocks. It is however, possible to include another type of tread element such as a circumferentially continuous rib. Preferably, the tread pattern is generally symmetrical about the tire equator C, except that the phase of the pattern is shifted in the circumferential direction between a right half and a left half thereof to reduce noise.

The tread portion 2 comprises a pair of axially inner block rows R1 with one disposed on each side of the tire equator C, a pair of middle block row R2 with one disposed axially outside of each of the inner block rows R1, and a pair of axially outer bock rows R3 with one disposed axially outside of each of the middle block rows R2. Thus, only six rows of blocks are disposed in this embodiment.

In the example shown in FIG. 2, the center circumferential groove 16 is straight, the outer circumferential groove 16 are zigzag, and the middle circumferential grooves 16 are also zigzag but steeper than the outer circumferential groove. The axial grooves 17 are straight. However, various configurations, e.g. wavy, zigzag or steplike configurations may be used.

The depth of the circumferential grooves 16 and axial grooves 17 are in the range of not less than 9 mm, in this example, a constant of about 12.5 mm.

As shown in FIG. 2, when a shoulder portion Sh is defined as axially outer part of the tread extending between the tread edge and a position at a distance CW of 25% of the tread width TW from the tire equator C, and a crown portion is defined as between the two shoulder portions Sh, in general, wear is more severe in the shoulder portions Sh than the crown portion and accordingly the heel/toe wear is liable to occur in the shoulder portions.

In this example, therefore, the middle and outer blocks 3B and 3C which have a center of gravity within the shoulder portions Sh are formed in a specific configuration which displays a high resistance to the heel/toe wear.

It is also possible to employ this specific configuration in the inner blocks 3A which have a center of gravity within the crown portion, but in this example, another configuration is used.

Taking the middle block 3B as example, this specific configuration will now be explained.

Figure 3:
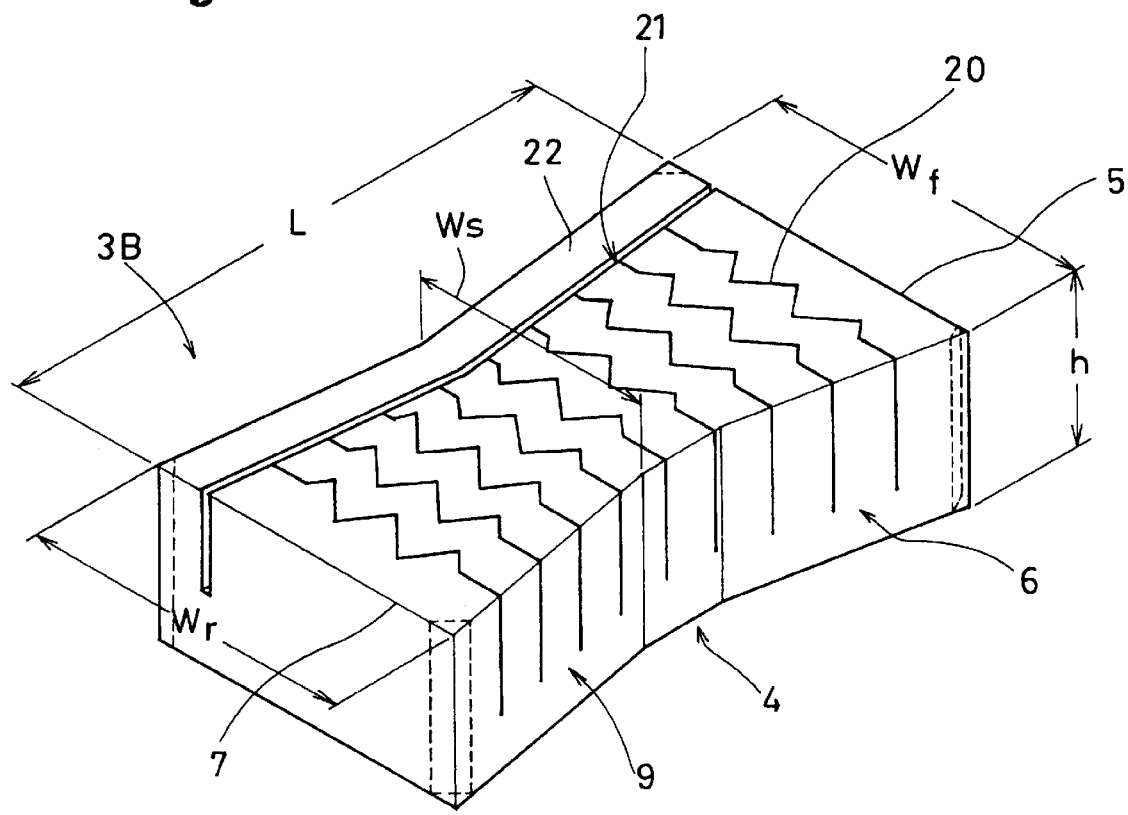
FIG. 3 is an enlarged perspective view showing the middle block thereof.

As shown in FIG. 3, the block configuration comprises a narrow-width portion 4 in which the axial block width Ws becomes minimum, an increasing-width portion 6 on the block heel-side in which the block width gradually increases from the narrow-width portion 4 to one edge (heel edge 5) of the block, and an increasing-width portion 9 on the block toe-side in which the block width gradually increases from the narrow-width portion 4 to the other edge (toe edge 7). Preferably, the heel edge 5 and toe edge 7 are parallel with the tire axial direction. However, it is also possible to form the edges 5 and 7 almost parallel as long as the angle formed with the tire axial direction is less than 15 degrees.

Figure 4:
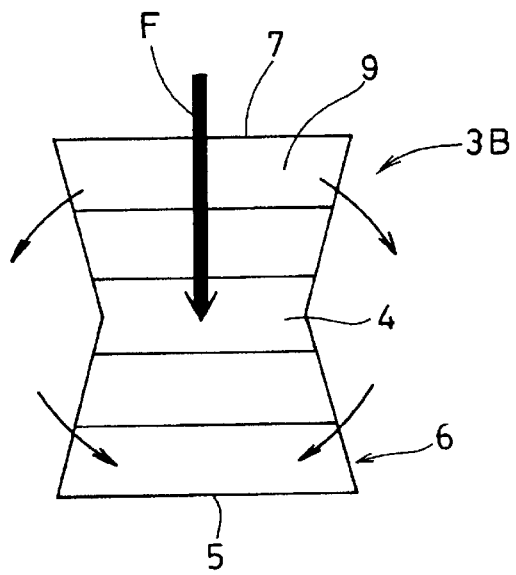
FIG. 4 is a diagram explaining the function of the block.

By providing such a configuration for the block, the block rigidity increases towards both the heel edge 5 and tow edge 7 from the narrow-width portion 4. As shown in FIG. 4, when a braking force F acts on the block, the stress produced in the rubber in the toe-side portion 7 is dispersed toward both sides of the block, but, in the heel-side portion 6 the stress concentrates on the block inside from both the sides thereof. As a result, the apparent rigidity of the heel-side portion 6 is increased to decrease the lifting thereof, and therefore the heel wear can be decreased. Similarly, when a driving force acts on the block, the toe-side portion 9 is increased in the apparent rigidity to decrease the lifting thereof, and therefore the toe wear can be decreased. Thus, the heel and toe wear of the block is effectively reduced.

In order to fully derive this effect, the block width Ws at the narrow-width portion 4 is set in the range of from 0.5 to 0.9 times the average {(Wf+Wr)/2} of the maximum block width Wf at the heel edge 5 and the maximum block width Wr at the toe edge 7.

Preferably, the average width {(Wf+Wr)/2} is set in the range of from 7 to 25% of the tread width TW.

The circumferential block length L is preferably more than the average width {(Wf+Wr)/2}. If the block length L is less than the average width, the block can not keep a proper rigidity balance between the circumferential direction and the axial direction, which is liable to deteriorate the steering stability of the tire. More preferably, the block length L is set in the range of from 1.5 to 3 times the average width.

As explained above, in the FIG. 2 example, this block configuration is employed in the middle and outer blocks 3B and 3C, and the heel edge width Wf is the same as the toe edge widths Wr, and the increasing of the block width is made continuously at a substantially constant rate from the narrow-width portion 4 to the edges 5 and 7. However, it is also possible to use different widths and/or vary the increasing rate as in the next example shown in FIG. 5.

In the inner block rows R1, the relatively wide and narrow axial grooves 17, having the same depth as the circumferential grooves 16, are alternatively disposed, and the inner blocks 3A have opposite trapezoidal shapes as shown in FIG. 2, and further the above-mentioned narrow axial grooves 17 are disposed between the adjacent shorter parallel sides of the trapezoid. Seemingly there is no significant difference in the block configuration from the middle and outer block rows R2 and R3.

Figure 5:
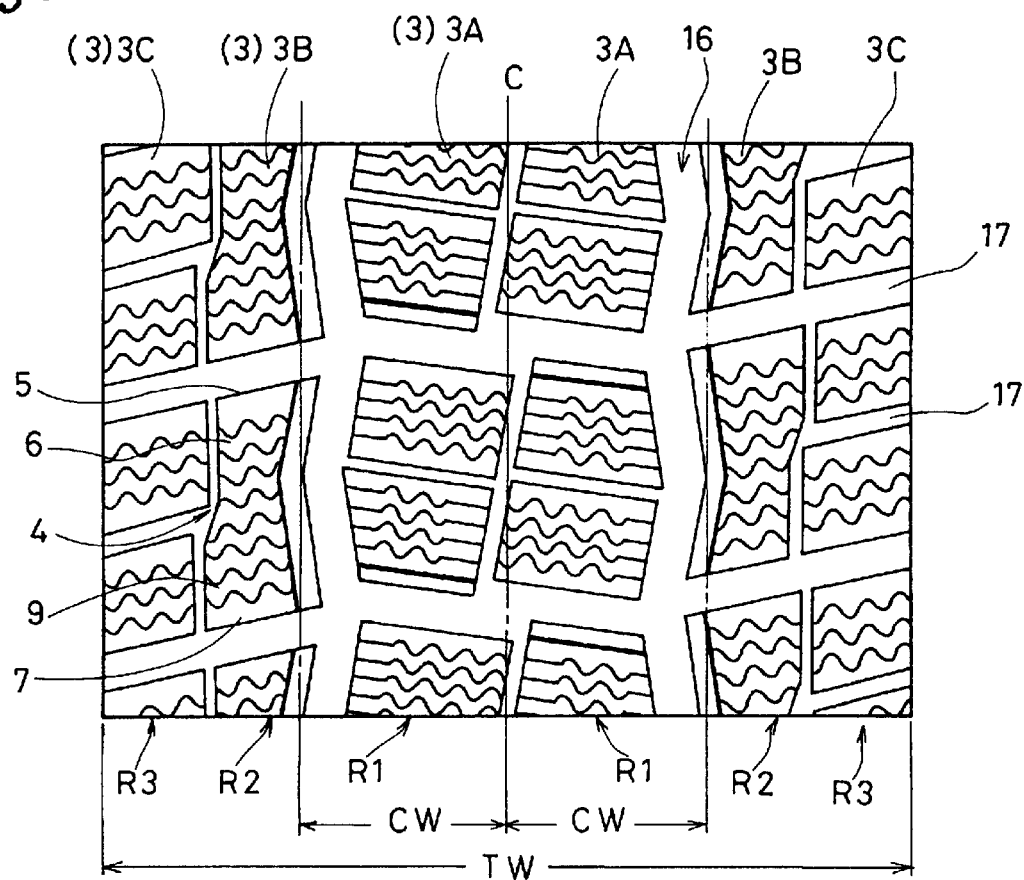
FIG. 5 is a developed plan view showing another example of the tread pattern.

FIG. 5 shows another example of the block pattern which also comprises only six rows of blocks R1, R3, R3, wherein the specific configuration according to the present invention is employed in only the blocks 3B in the middle block rows R2. The blocks 3B are disposed in axially outer part of the tread such that the distance of the center of gravity thereof from the tire equator C is larger than 25% of the tread width TW.

In this example, the axial groove 17 is straight and inclined at a small angle within the above-mentioned range. The heel width and toe width are different from each other.

According to the present invention, one of the side edges of the above-mentioned specific block configuration is formed in a generally v-shape, but the other can be formed in a different shape, for example, straight shape (3C in FIG. 2), crank or zigzag shape (3B in FIG. 5).

The corners at the ends of the heel edge 5 and tow edge 7 can be rounded or chamfered as shown in FIG. 3 in broken line. In each block 3A, 3B, 3C, the ratio L/h of the block length L to the block height h is preferably in the range of from 1.6 to 4.5.

Further, each block 3 is preferably provided with sipes 20 and/or a narrow groove 21. Here, the narrow groove is a groove of from 1 to 5 mm width, and the sipe is a cut or slit under 1.0 mm width. The depth of the sipes 20 and narrow grooves 21 is set to be less than 1.0 times but not less than 0.5 times the block height H. Thus, the sipes 20 and narrow grooves 21 are not for dividing the block, but for improving the compliance of the blocks with the road surface.

In FIG. 2, the blocks 3B and 3C are provided with a circumferentially extending narrow groove 21 disposed near the axially outer edge and along the entire length thereof to form a narrow rib part 22. In this example, the circumferential ends of the narrow groove 21 are opened at the circumferential edges of the block.

In the middle block row R2, each block 3B is provided with a narrow groove 21 and several sipes 20, wherein the sipes 20 extend from the axially inner edge of the block to the narrow groove 21, and the narrow rib part 21 is provided with no sipe to maintain the rigidity.

In the outer block row 3C, each block 3B is provided with several sipes 20, but a narrow groove 21 is disposed in every second block, and the sipes 20 extend from the axially inner edge to the outer edge of the block. Further, each block 3C is provided in the circumferential center with two parallel narrow grooves extending across the entire width of the block. Preferably, the axially extending sipe comprises straight side portions extending substantially parallel with the tire axial direction at an angle of not more than 5 degrees, and a zigzag middle portion therebetween to increase the length thereof.

Comparison Test

Block pattern tires of size 165/80R13 82Q having the same internal tire structure shown in FIG. 1 were made by way of test and tested for the heel/toe wear resistance and on-the-snow/ice performances as follow. The test results are shown in Table 1.

A) on-the-snow feeling test The test tires were mounted on all the wheels of a 1500 cc front-wheel-drive vehicle and run on a snowy road and evaluated by the test driver's feeling into ten ranks wherein the reference tire is six.

B) On-the-ice brake $\mu$ factor test

Using the same vehicle as in test A), a wheel lock brake test was made at a speed of 40 km/h in an icy test course and the friction coefficient was calculated from the braking distance to stop. The results shown in Table 1 are indicated by an index based on that the reference tire 1 is 100. The larger value is better.

(tire inner pressure: 190 kpa)

C) Heel/toe wear test

In the same way as explained above, the average heel/toe wear was measured. The results shown in Table 1 are indicated by an index based on the reference tire is 100. The smaller the value, the smaller the heel/toe wear.

TABLE 1

Figure 6:
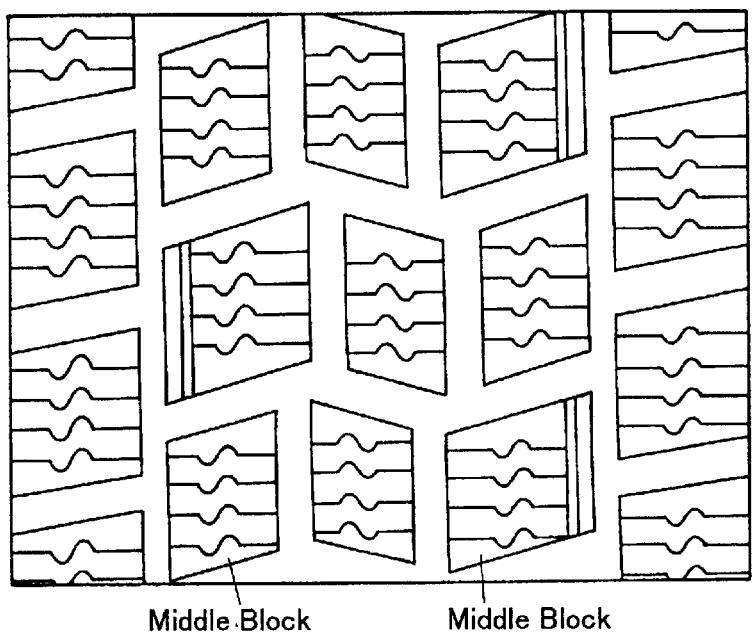
FIG. 6 is a developed plan view showing a conventional tread pattern.
Figure 7A:
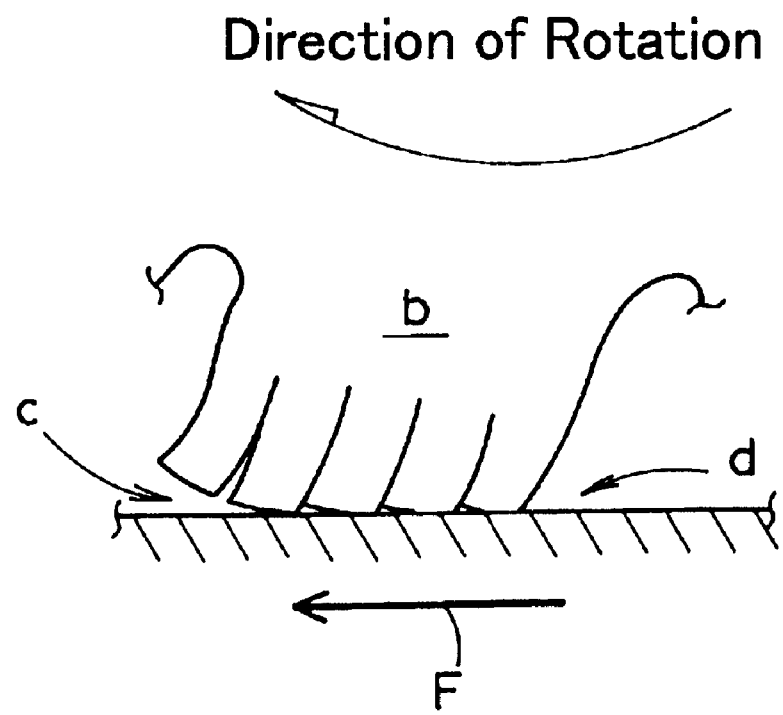
FIGS. 7(a) and (b) are cross sectional views showing prior art.
Figure 7B:
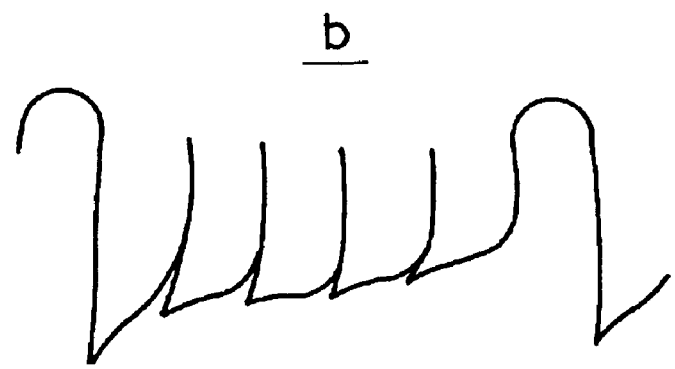
Figure 8:
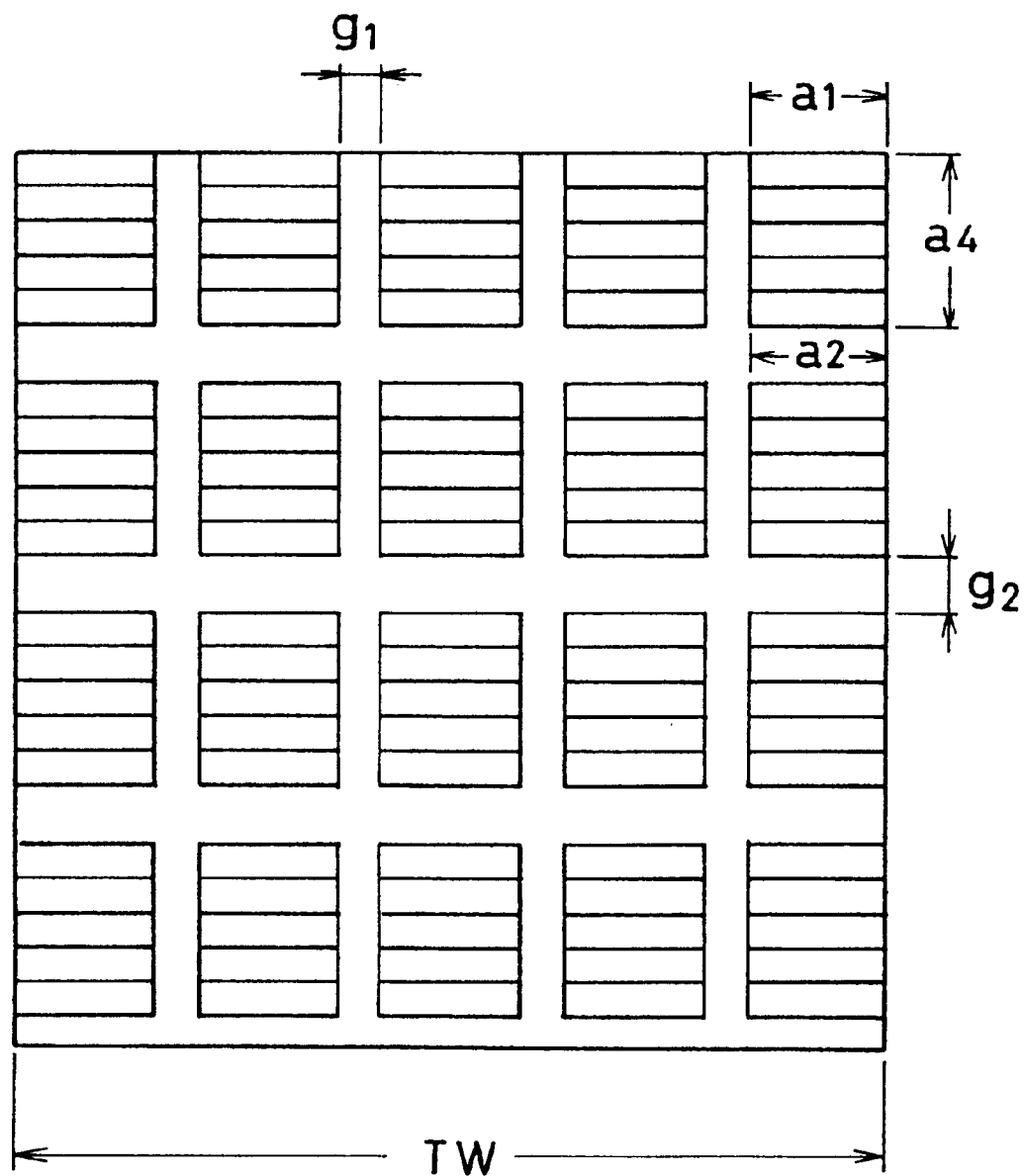
FIG. 8 is a developed plan view showing the tread pattern of Test Tire A in FIG. 11.
Figure 9:
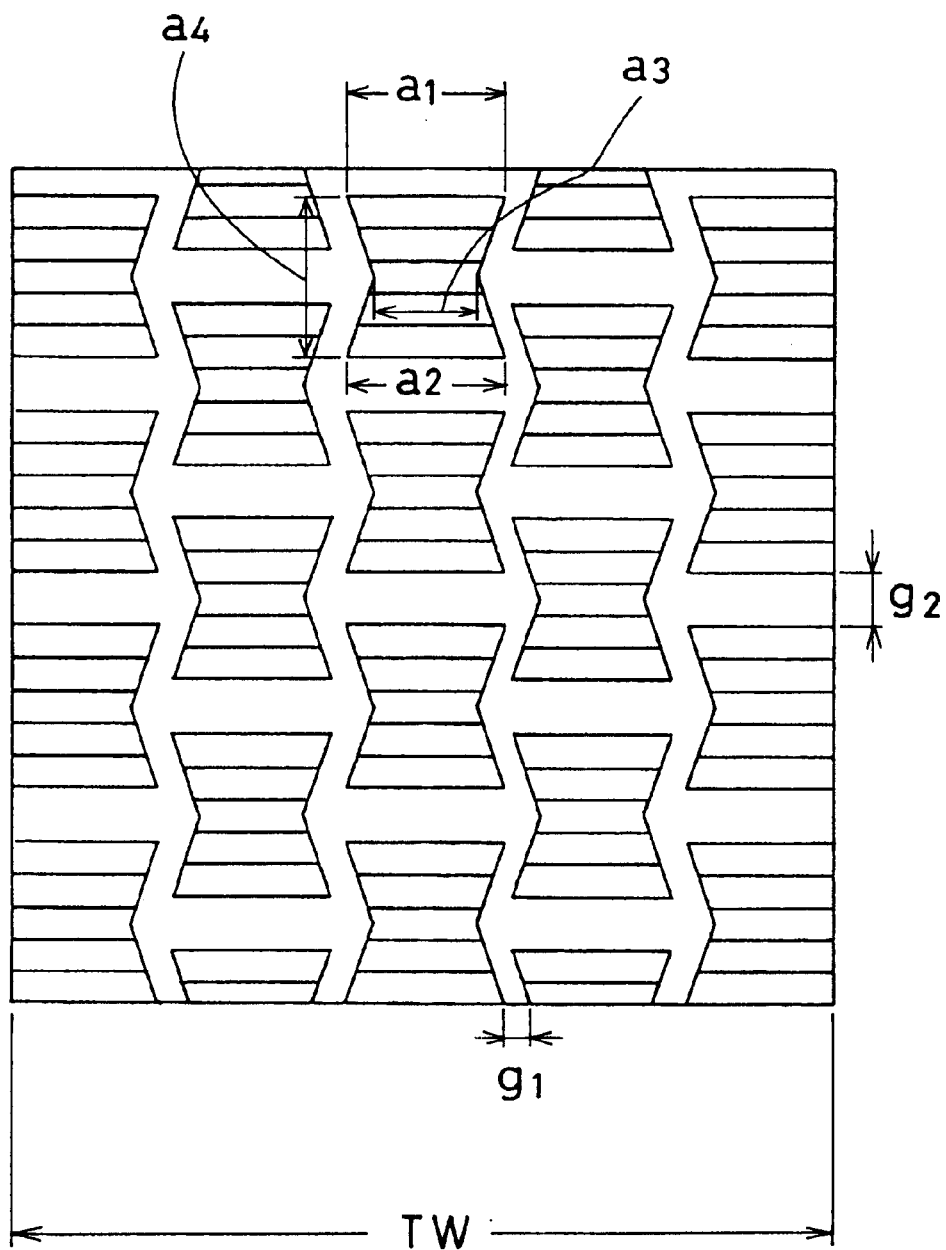
FIG. 9 is a developed plan view showing the tread pattern of Test Tire B in FIG. 11.
Figure 10:
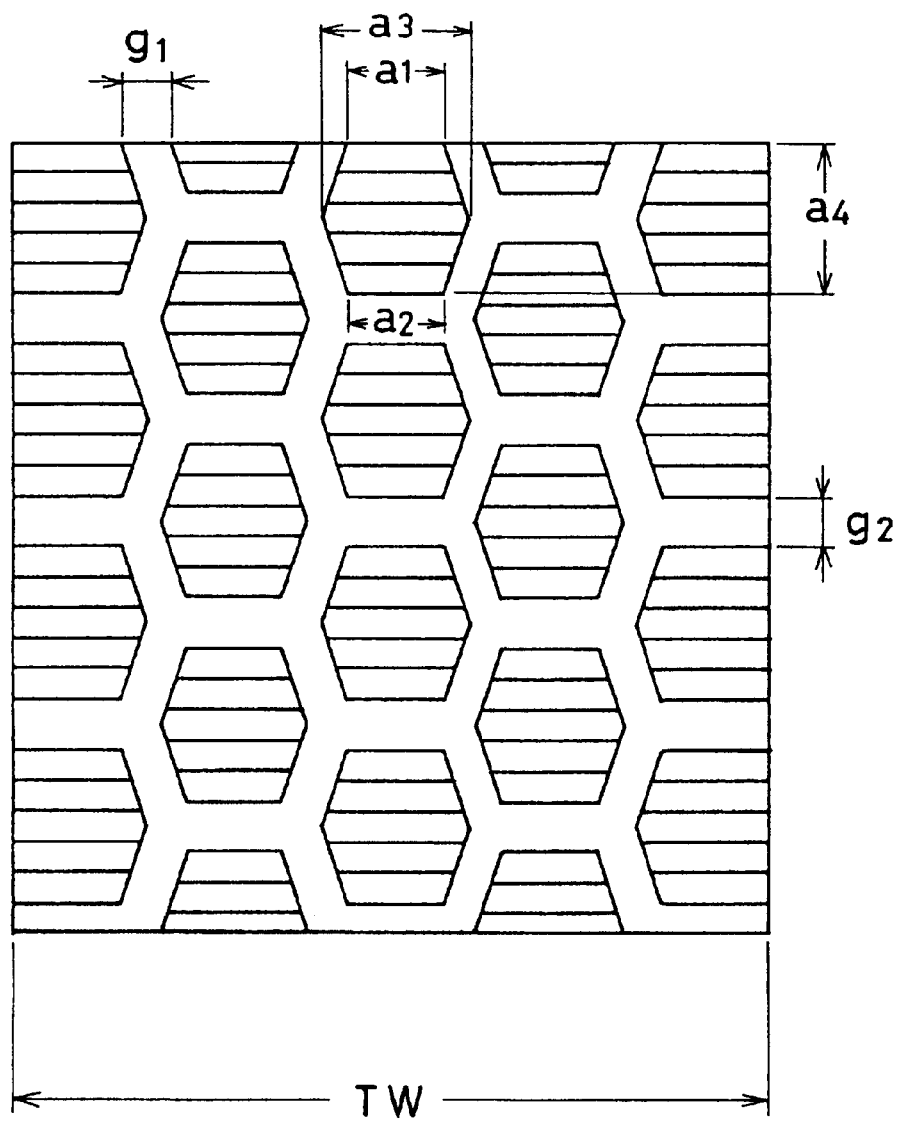
FIG. 10 is a developed plan view showing the tread pattern of Test Tire C in FIG. 11.
Figure 11:
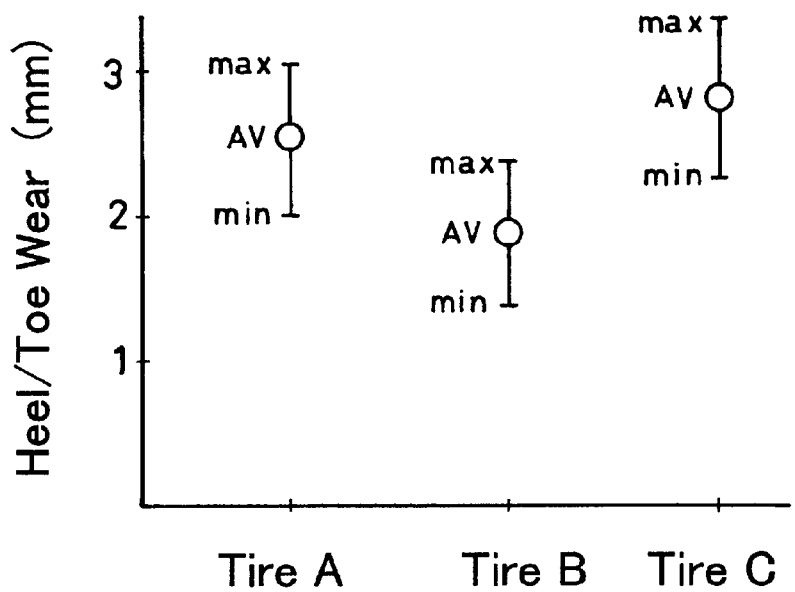
FIG. 11 is a graph showing the heel-toe wear of Test Tires A to C.
Figure 12:
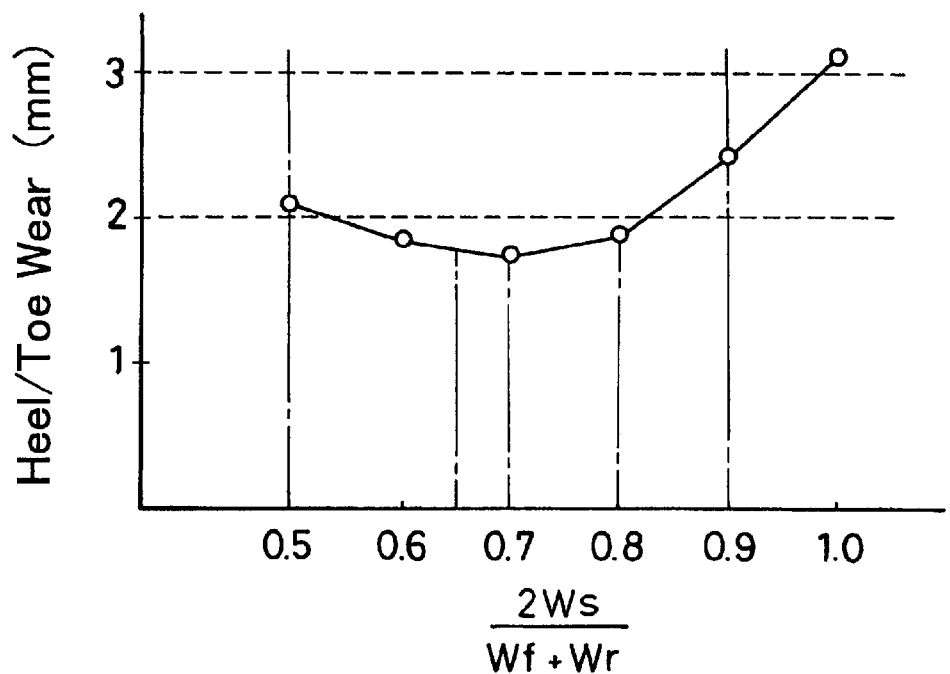
FIG. 12 is a graph showing a relationship between the heel-toe wear and the ratio of the average edge width to the narrow-width portion width.

|  | Tire | | |
| --- | --- | --- | --- |
|  | Ref. | Ex. 1 | Ex. 2 |
| Tread pattern | FIG.6 | FIG.2 | FIG. 6 |
| Middle block | | | |
| Block length L (mm) | 21 | 32 | 32 |
| Block width (mm) | | | |
| Wf (Heel) | 17 | 13 | 14 |
| Wr (Toe) | 17 | 13 | 9 |
| Ws (Narrow) | 17 | 8.4 | 7.2 |
| 2Ws/(Wf + Wr) | 1 | 0.65 | 0.63 |
| Test result | | | |
| On-the-snow feeling (index) | 6 | 6.5 | 7 |
| On-the-ice brake $\mu$ factor | 100 | 108 | 105 |
| Heel/toe weer (index) | 100 | 87 | 90 |

From the test results, it was confirmed that the tires according to the present invention were improved in the heel/toe wear resistance and on-the-snow/ice performances. With respect to the number of blocks having the specific configuration according to the present invention, when the number is increased, on-the-snow braking performance is improved. Contrarily, when the number is decreased, on-the-snow feeling performance is improved.

As explained above, in the studless tire according to the present invention, the resistance to heel/toe wear can be improved, maintaining or improving the on-the-snow/ice running performance.

The invention being thus described, it will be obvious that the same may be varied in may ways. Such variations are not

We claim:

1. A studless tire comprising:

a tread portion comprising blocks divided by axial grooves and at least one circumferential groove, each block having two circumferential edges extending in substantially parallel with the tire axial direction and two side edges, said blocks including edge blocks arranged in two circumferential rows, each edge block being disposed on an edge portion of said tire, and middle blocks arranged in two circumferential rows, each middle block disposed immediately axially inside of one of the rows of the edge blocks, each middle block comprising:

a narrow-width portion in which the axial width of the block is minimum, a heel side increasing-width portion in which at least one of said side edges inclines with respect to the tire equator from the narrow-width portion substantially to one of the circumferential edges such that the axial width thereat is greater than the width of the narrow-width portion, a toe-side increasing-width portion in which at least one of said side edges inclines with respect to the tire equator from the narrow-width portion substantially to the other circumferentail edge such that the axial width thereat is greater than the width of the narrow-width portion, the minimum width in the narrow-width portion being in the range of from 0.5 to 0.9 times the average of the maximum width in the heel side increasing-width portion and the maximum width in the toe-side increasing-width portion, one of the two side edges of each middle block having a substantially V-shaped configuration, each middle block being provided with a narrow groove extending in substantially parallel with the V-shaped side edge and zigzag or wavy sipes extending from the narrow groove to the other side edge, one of the two side edges of each edge block having a substantially V-shaped configuration while each respective opposing side edge having a substantially straight shape.

2. The studless tire according to claim 1, wherein said tread portion is made of rubber having a JIS-A hardness of from 50 to 60 degrees at a temperature of 0 degree C.

3. The studless tire according to claim 1, wherein the circumferential length of each said block is more than said average width.

4. The studless tire according to claim 1, wherein said blocks are disposed in a lateral region of the tread which is defined as extending axially outwardly from a position at a distance of 25% of the tread width from the tire equator.

5. The studless tire according to claim 1, wherein said minimum width in the narrow-width portion is in the range of from 0.65 to 0.8 times said average of the maximum widths.

6. The studless tire according to claim 1, wherein each V-shaped side edge of each middle block is an axially outer side edge.

7. The studless tire according to claim 1, wherein each V-shaped side edge of each middle bock is an axially inner side edge.

8. The studless tire according to claim 1, wherein each middle block has a crank-shaped side edge and a respective V-shaped side edge.

9. The studless tire according to claim 1, wherein each side edge other than a respective V-shaped side edge of each middle block has a generally V-shape made up of two inclining parts and a circumferential part therebetween.

10. The studless tire according to claim 1, wherein each edge block is provided with zigzag or wavy sipes extending across a width of the block.

11. A studless tire comprising:

a tread portion comprising blocks divided by axial grooves and at least one circumferential groove, each block having two circumferential edges extending in substantially parallel with the tire axial direction and two side edges, said blocks including edge blocks arranged in two circumferential rows, each edge block being disposed on an edge portion of said tire, and middle blocks arranged in two circumferential rows, each middle block disposed immediately axially inside of one of the rows of the edge blocks, each middle block comprising:

a narrow-width portion in which the axial width of the block is minimum, a heel side increasing-width portion in which at least one of said side edges inclines with respect to the tire equator from the narrow-width portion substantially to one of the circumferential edges such that the axial width of the heel side increasing-width portion gradually increases from the narrow-width portion to the edge, a toe-side increasing-width portion in which at least one of said side edges inclines with respect to the tire equator from the narrow-width portion substantially to the other circumferential edge such that the axial width of the toe-side increasing-width portion gradually increases from the narrow-width portion to the edge, the minimum width in the narrow-width portion being in the range of from 0.5 to 0.9 times the average of the maximum width in the heel side increasing-width portion and the maximum width in the toe-side increasing-width portion, one of the two side edges of each middle lock having a substantially V-shaped configuration, each middle block being provided with a narrow groove extending in substantially parallel with the V-shaped side edge and zigzag or way sipes extending from the narrow groove to the other side edge, one of the two side edges of each edge block having a substantially V-shaped configuration, while each respective opposing side edge having a substantially straight shape.

12. The studless tire according to claim 11, wherein each V-shaped side edge of each middle block is an axially outer side edge.

13. The studless tire according to claim 11, wherein each V-shaped side edge of each middle block is an axially inner side edge.

14. The studless tire according to claim 11, wherein each middle block has a crank-shaped side edge and a respective V-shaped side edge.

15. The studless tire according to claim 11, wherein each side edge other than a respective V-shaped side edge of each middle block as a generally V-shape made up of two inclining parts and a circumferential part therebetween.

16. The studless tire according to claim 11, wherein each edge block is provided with zigzag or wavy sipes extending across a width of the block.

* * * * *